United States Patent [19]

Yabuuchi et al.

[11] Patent Number: 4,497,035

[45] Date of Patent: Jan. 29, 1985

[54] METHOD OF GENERATING TIME DELAY

[75] Inventors: Shigeru Yabuuchi, Tokyo; Takeyuki Endoh, Kodaira; Kazuyuki Kodama, Hachioji; Jushi Ide, Mito, all of Japan

[73] Assignee: Hitachi, Ltd., Tokyo, Japan

[21] Appl. No.: 337,292

[22] Filed: Jan. 5, 1982

[30] Foreign Application Priority Data

Jan. 16, 1981 [JP] Japan .................................. 56-3790

[51] Int. Cl.³ ........................ G06F 15/32; G06J 1/02
[52] U.S. Cl. ................................... 364/577; 364/723; 307/602
[58] Field of Search ............... 364/702, 723, 569, 577, 364/178, 179; 328/55, 56, 58; 307/600–602, 607; 318/573

[56]   References Cited
U.S. PATENT DOCUMENTS

| | | | |
|---|---|---|---|
| 3,735,270 | 5/1973 | Holub ................................... | 307/601 |
| 4,106,100 | 8/1978 | Okada et al. ......................... | 364/702 |
| 4,117,409 | 9/1978 | O'Brien ................................ | 328/56 |
| 4,125,897 | 11/1978 | Murata et al. ....................... | 364/702 |

Primary Examiner—Felix D. Gruber
Assistant Examiner—Thomas G. Black
Attorney, Agent, or Firm—Antonelli, Terry & Wands

[57]   ABSTRACT

In order to deliver an input signal of each operation cycle after a desired time delay, there are disposed data memory means for storing the input signal, counter means for appointing write addresses of the data memory means, and address memory means for appointing read addresses of the data memory means. The address memory means is divided into partial memory areas equal in number to time delay elements, whereupon while sampling the input signal at a predetermined sampling period and changing the count value of the counter means one by one for each of the desired time delay elements at each sampling point, the variations of the input signal in a sampling interval between the particular sampling point and the adjacent sampling point are successively written into the memory means. Further, while changing the contents of the partial memory areas corresponding to the desired time delay element to the number of the time delay elements in each sampling interval, the variations in a sampling interval preceding a predetermined sampling number to the particular sampling interval are successively read out from the memory means. The input signal of each operation cycle in the preceding sampling interval is presumed by an interpolation operation based on the variation and the sampling period, and the result is used as an output signal of the desired time delay element.

8 Claims, 22 Drawing Figures (A)

(B)

(C)

(D)

|  | EL | DT | $P_X$ | $\Delta X_A$ | $P_1$ | $\Delta Y_{A1}$ | $P_2$ | $\Delta Y_{A2}$ | $P_3$ | $\Delta Y_{A3}$ |
|---|---|---|---|---|---|---|---|---|---|---|
| N−2 CYCLE | INT | | | | | | | | | |
| N−1 CYCLE | LIM | | | | | | | | | |
| N CYCLE | $DLY_I$ | | | | | | | | | |
| N+1 CYCLE | $DLY_{II}$ | | | | | | | | | |
| | | | | | | | | | | |
| M CYCLE | | | | | | | | | | |

SEQUENCE OF ARITHMETIC

METHOD OF GENERATING TIME DELAY

BACKGROUND OF THE INVENTION

1. Field of the Invention

This invention relates to a method of generating a time delay in a digital differential analyzer (hereinbelow, abbreviated to "DDA") etc.

In the description of the principles of this invention, a case where the method of this invention to generate a time delay is applied to a DDA will be taken as an example. The invention, however, is also applicable to apparatuses other than a DDA, which will be described in detail in connection with the preferred embodiments.

In the case of employing a DDA for, e.g., the analysis of a process control system or the calculation of a correlation coefficient, a time delay T expressed by the following equation needs to be generated:

$$e_o(t) = e_{in}(t - T) \tag{1}$$

where $e_{in}$ denotes an input signal, and $e_o$ an output signal.

2. Description of the Prior Art

In general, as methods of generating time delays, there are (a) a method which utilizes approximation by a transfer function (refer to "On the analog simulation of a pure time delay", Simulation, 1972, 18, (5), pp. 161–170), and (b) a method which utilizes a time delay arithmetic unit based on a storage mode.

Regarding the former, Padé's approximate formulas are famous. However, they can generate only short time delays of $\omega T < 2$[rad] with the second approximate formula and $\omega T < 6$[rad] with the fourth approximate formula, $\omega$ in the inequalities being representative of the angular frequency of an input signal. Another disadvantage is that an output signal becomes oscillatory for indicial response. Moreover, a large number of DDA arithmetical elements (for example, ten or more elements for Padé's fourth approximate formula) are required. In view of such drawbacks, it can be said that it is unpractical to apply to the DDA the method which employs approximation by a transfer function.

On the other hand, a kind of storage mode of the latter wherein an input signal is sampled at a certain period h, the sampled signal is stored into a digital memory and the stored signal is read out from the memory and then reconstructed and delivered after the lapse of a certain time delay, is a method suited to the DDA which handles all signals as digital signals. It has also the feature that a long time delay can be realized merely by increasing the capacity of the memory.

In the case of applying this method to the DDA, however, several problems as stated hereunder are involved.

The first problem is that the sampling period h must be made small in order to compute a time delay of high precision, so a large memory capacity is required in order to generate a long time delay. FIGS. 1(A)–1(D) illustrate the principle of the storage mode. An input signal $e_{in}$ being a continuous function as shown in FIG. 1(A) is sampled at a sampling period h as shown in FIG. 1(B). Sampling values $e_{in}(p)$ (p=0, 1, ... ) in the order of the No. of the sampling points are successively stored in sequence into addresses of a digital memory as shown in FIG. 1(C). Upon lapse of a time delay T, the sampling values are read out from the digital memory in the order of $e_{in}(0)$, $e_{in}(1)$, ... and then reconstructed and delivered. Accordingly, a time delay output signal $e_o$ becomes a stepped waveform as shown in FIG. 1(D). Here, the error $\epsilon$ of the time delay output signal becomes as follows:

$$\begin{aligned}\epsilon(t - T) &= 0 & \text{for } t < T \\ \epsilon(t - T) &= e_{in}(t - T) - e_{in}(h \cdot p) & \text{for } t \geq T\end{aligned} \tag{2}$$

Accordingly, the error $\epsilon$ for $p \cdot h \leq t < (p+1) \cdot h$ becomes zero at the sampling point p, and it increases more as the next sampling point (p+1) comes nearer. By way of example, in the case where the time delay has been generated by the method of FIGS. 1(A)–1(D) as to:

$$e_{in} = A \sin x \tag{3}$$

the absolute error $\epsilon$ becomes:

$$\epsilon = A \sin\left[\left(p + \frac{\tau}{h}\right) h\right] - A \sin(p \cdot h) \tag{4}$$

where $0 \leq \tau < h$

The maximum error develops in the vicinity of the maximum gradient of Equation (3), that is, in the vicinity of x=0. The maximum error in the vicinity of x=0 can therefore be approximately evaluated by substituting p=0 and $\tau$=h into Equation (4), as follows:

$$\epsilon_{max} \simeq A \sin h \tag{5}$$

It is understood from Equation (5) that, in order to limit the calculation error of the time delay to 0.1% of the full scale A, the sampling period h must be made 0.001 [rad]. In other words, about 6,280 ($\simeq 2/0.001$) points must be sampled within one cycle. Now, let's consider a case where a sine wave having an angular frequency $\omega$ is sampled at a sampling period h over a delay time T. Letting B (bytes) denote the length of one word of a memory for expressing a sampling value, the capacity W of the memory required per time delay element becomes:

$$W = \frac{\omega T}{h} \times B \text{ (bytes)} \tag{6}$$

Assuming by way of example $\omega$=10 rad/s, T=5 sec, h=0.001 rad and B=4 bytes, the capacity W becomes as large as 0.2M bytes.

The second problem is attributed to the calculation method of the DDA.

The DDA adopts the calculation method in which each of an input variable, an output variable and an integral independent variable is rounded off into 1 bit or several bits and then transmitted (refer to Japanese Patent Application Publication No. 50-25148 and Japanese Patent Application Publication No. 50-32849). This leads to the problem that also the output signal of the time delay must be converted into an increment of 1 bit or several bits.

SUMMARY OF THE INVENTION

An object of this invention is to provide a method of generating a time delay as based on the digital memory storage mode, which method is free from the problems described above, is inexpensive and has the function of generating a long time delay at high precision.

In order to accomplish the object, this invention is contrived as stated below. At the first feature, two sorts of digital memories A and B to generate a time delay are provided. An input signal of a time delay element expressed in an incremental format of 1 bit or several bits is accumulated every operation cycle (hereinbelow, termed "iteration") of a DDA. A sampling period h is set to be an integral number of times of the iteration, and the accumulative values or the increment values of the input signal in 1 sampling interval are successively stored into the memory A every sampling period. After the storage processing has advanced to an address which is appointed by a quotient u (integer value) with the time delay T divided by the sampling period h, the increment values of the input signal are read out every sampling period h from those addresses of the memory A which precede at most (u−1), interpolation operations of an incremental format as described later are performed in the respective iterations of the DDA, and the results of the interpolation operations are stored into the memory B. Thereafter, the contents of those addresses of the memory B which precede at most a residue v (integer value) resulting from the division of the time delay T by the sampling period h are read out, and are provided as an output signal of the time delay.

As the second feature, address counters ADCA and ADCB which manage the addresses of the memories A and B to store data thereinto are respectively provided for the memories A and B. The ADCA has 1 (one) added every sampling period H and every time delay element, and the sampling value is stored into the resulting address of the memory A. Simultaneously, the ADCB has 1 (one) added every iteration and every time delay element, and the interpolated value is stored into the resulting address of the memory B. In this way, it is permitted to write data into both the digital memories continuously in a ring shape without limitation.

As the third feature, address memories ADMA and ADMB with manage the addresses of the memories A and B to read out data therefrom are respectively provided for the memories A and B, and each address memory ADMA or ADMB includes storage locations equal in number to the time delay elements. The content of that memory within the ADMA which corresponds to the time delay element noted has the total number of the time delay elements added every sampling period h, and the data is read out from the resulting address of the memory A. Simultaneously, the content of that memory within the ADMB which corresponds to the time delay element noted has the total number of the time delay elements added every iteration, and the data is read out from the resulting address of the memory B. In this way, it is permitted to read out ring-shaped data formed on the memories A and B, continuously and unlimitedly.

Hereunder, the principles of this invention will be described in detail.

First, in order to sharply reduce the capacity of a memory for storing sampling values, this invention executes the operation of interpolation indicated by Equation (7) and obtains a time delay output signal $e_o(t)$ at time t ($t = T + p.h + \tau$) after the lapse of the time delay T, where $0 \leq \tau < h$.

$$e_o(p \cdot h + \tau + T) = \frac{e_{in}[(p+1) \cdot h] - e_{in}(p \cdot h)}{h} \times \tau + e_{in}(p \cdot h), \text{ i.e. } \epsilon = e_{in}(t - T) - e_o(t), \quad (7)$$

FIG. 2 shows the time delay output signal delivered in such a way that the input signal $e_{in}$ shown in FIG. 1(A) is sampled at the same sampling period h as in FIG. 1(B) and that after the lapse of the time delay T, the sampling values are subjected to the interpolation operation of Equation (7). Merely by comparing FIG. 1(D) and FIG. 2, it is understood that the present method attains a higher accuracy. An error $\epsilon$ in the interpolation of Equation (7) becomes:

$$\epsilon = e_{in}[p \cdot h + \tau] - \frac{e_{in}[(p+1) \cdot h] - e_{in}(p \cdot h)}{h} \times \tau - e_{in}(p \cdot h) \quad (8)$$

Here, by taking as an example a case where the input signal expressed by Equation (3) is operated by the method of Equation (7), the error at the generation of the time delay in the present method will be compared with that in the method of FIGS. 1(A)–1(D). The maximum value of the error expressed by Equation (8) develops when the conditions of $d\epsilon/d\tau = 0$ and $d^2\epsilon/d\tau^2 < 0$ hold. When the conditions causing the maximum error are obtained by substituting Equation (3) into Equation (8), it is understood that the maximum error develops in a state illustrated in FIG. 3. Accordingly, the maximum error $\epsilon_{max}$ becomes:

$$\epsilon_{max} = A\left(1 - \cos\frac{h}{2}\right) \quad (9)$$

As seen from Equation (9), in order to limit the error at the generation of the time delay to 0.1% of the full scale A, the sampling period h may be made about 0.08945 [rad]. In other words, one cycle may be sampled at about 70 points. Since the method of FIGS. 1(A)–1(D) requires about 6,280 sampling points in order to attain the same accuracy, the time delay generating method based on the interpolation mode in accordance with this invention suffices with about 1/90 of the sampling points in the method of FIGS. 1(A)–1(D) and can remarkably reduce the capacity of the digital memory.

A problem to be solved next is how the output signal of the time delay obtained by executing the aforecited interpolation operation in combination with the sampling value-storing digital memory is converted into an incremental format and then delivered by the use of simple means. An operating method therefor is illustrated in FIG. 4 and FIGS. 5(A)–5(E).

First, Equation (7) is converted into the incremental format of the following equation:

$$\Delta e_o(p \cdot h + \tau + T) = \frac{e_{in}[(p+1) \cdot h] - e_{in}(p \cdot h)}{h} \times \tau. \quad (10)$$

Operating steps indicated by Equation (11) are executed by means of the DDA by setting $\tau$ at $\Delta t$ which is the fine increment of the fundamental integral independent variable t of the DDA, and the interpolation operation in which the resulting output increment $\Delta Z_i$ is used as the increment $\Delta e_o$ of the output signal of the time delay element is executed.

$$\left. \begin{array}{ll} \text{Step 1} & R_i = R_{i-1} + Y_i \cdot \Delta t - \Delta Z_i \\ \text{Step 2} & Y_i = \dfrac{e_{in}[(p+1) \cdot h] - e_{in}(p \cdot h)}{h} \end{array} \right\} \quad (11)$$

Here, letter i represents the iteration No. of the DDA included between the sampling points p and (p+1), symbol $Y_i$ represents the content of a Y register at the i-th iteration or the gradient of the aforecited $\Delta e_o$, symbol $R_i$ represents an integral residue at the i-th iteration, and symbol $R_{i-1}$ represents an integral residue at the (i−1)-th iteration. Further, all these variables shall be handled with floating-point numbers.

In actuality, however, it is not advantageous to operate Equation (11) as it is. This is because a divider circuit is required for the computation of the gradient $Y_i$. In accordance with this invention, therefore, the sampling period h is set at an integral number of times m of $\Delta t$ and the integer m is selected to be the power of 2, as illustrated in FIG. 4, whereby the gradient $Y_i$ is obtained by only addition and subtraction. This will now be described.

By making m the power of 2, the sampling period h becomes as follows:

$$h = m \cdot \Delta t = 2^b \cdot \Delta t \ (b = \text{integer}) \quad (12)$$

Subsequently, when the increment of the input signal $e_{in}$ between the sampling points p and (p+1) is put as:

$$SDY_{p+1} = e_{in}[(p+1) \cdot h] - e_{in}(p \cdot h) \quad (13)$$

the gradient $Y_i$ in Equation (11) becomes:

$$Y_i = \frac{SDY_{p+1}}{\Delta t} \cdot 2^{-b} \quad (14)$$

Further, when $\Delta t$ is set at $2^k$ (k=integer) and when the mantissa of the increment $SDY_{p+1}$ is denoted by $SDY_{p+1}(M)$ and the exponent thereof by $SDY_{p+1}(E)$, the gradient $Y_i$ becomes as follows:

$$Y_i = SDY_{p+1}(M) \times 2^{[SDY_{p+1}(E) - b - k]} \quad (15)$$

Thus, it can be said that the gradient $Y_i$ can be evaluated by only the addition and subtraction of the exponent.

In the above, the interpolation operation method of this invention for use in the generation of the time delay has been described. There is another problem which must be solved. It concerns the write and read control method for the digital memory used for generating the time delay, and the structure of the memory. Hereunder, a method of the present invention in this connection will be explained.

Here, FIG. 4 will be taken as an example. In case where the output signal having the time delay T as shown by $e_o$ in FIG. 4 is to be generated from the input signal $e_{in}$, the sampling period h is selected at m·$\Delta t$ as stated before. The increment SDY of the input signal $e_{in}$ in the sampling interval as represented by Equation (13) is sampled every sampling period h, and it is stored into the digital memory A. This is illustrated in FIGS. 5(A)–5(E). FIG. 5(A) shows a block diagram of a time delay element ($e^{-ST}$: S indicates the Laplace operator). The increment of $e_{in}$ in the sampling interval is evaluated by operation steps given in Equation (16):

$$\left. \begin{array}{ll} \text{Step 1} & SDY_i = SDY_{i-1} + \sum_{j=1}^{l} \Delta Y_{i,j} \\ \text{Step 2} & \text{if } i = p, SDY_p = SDY_i \text{ and } SDY_i = 0 \end{array} \right\} \quad (16)$$

Here, $\Delta Y_{i,j}$ denotes the j-th input signal at the i-th iteration, l the number of inputs of the time delay element, and $SDY_i$ the accumulative value of the input signal at and after the sampling point (p−1).

In this way, the incremental values of the sampling interval are stored into the digital memory A (hereinbelow, termed "memory A") in succession as shown in FIG. 5(B) (phase I). Subsequently, the incremental value of the input signal sampled the time delay T earlier is read out from the memory A, and it is used as an input signal Y in FIG. 5(C) so as to compute the output signal of the time delay (phase II). Since, however, m is made $2^b$ in this invention as described before, the integral number of times of the sampling period h does not always agree with the time delay T, and a residue or remainder remains for a time interval T" (=q·$\Delta t$) as shown in FIG. 4. In accordance with this invention, therefore, the method to be described below is performed. Values n and q which satisfy the relation of the following equation are found:

$$T = T' + T'' = n \cdot h + q \cdot \Delta t \ (0 \leq q \cdot \Delta t < h) \quad (17)$$

When a sampling point of p=n has been reached in FIG. 5(B), the increment value $SDY_{p-n+1}$ of the input signal having been stored at a sampling point (p−n+1) is read out from the memory A, and it is used to obtain the gradient $Y_i$ with Equation (15). Using this value $Y_i$ as the input signal in FIG. 5(C), the computation of Equation (11) is performed. Thus, the output signal $\Delta Z'$ of the time delay at $t' = n \cdot h$ is evaluated every $\Delta t$ as illustrated as the intermediate output signal $e_o'$ of the time delay element in FIG. 4. As shown in FIG. 5(D), the output signal $\Delta Z'$ is stored into a memory B every $\Delta t$. In order to generate the time delay T" (=q·$\Delta t$) which becomes the odds, a value $\Delta Z'_{i-q}$ stored in the address of the memory B preceding q addresses is read out as the output signal $\Delta Z_i$ of the desired time delay. This output signal is made the output signal $e_o$ of the time delay element in FIG. 4. In addition, FIG. 5(E) illustrates the time relationship between the write signal into the memory B and the read signal from the memory B.

Now, the method of controlling the write and read operations of the memories A and B will be described with reference to FIGS. 6 to 8.

In general, the lengths of time delays are not fixed, but time delays having various lengths exist within a single system. The angular frequencies $\omega$ of the input signals of the system are also various. Accordingly, the optimum sampling period satisfying a computation accuracy becomes different. From the standpoint of reducing to the utmost the capacities of the memories A and B used for the computation of the time delay, it is desirable to sample the input signal at the sampling period which is the most suitable for each particular time delay. In this case, however, the write and read control for which the memories A and B are possessed for each time delay element must be conducted, and the control of the interpolation operation must also be conducted for each time delay element. These result in the disadvantage of complicated circuitry. This invention therefore adopts a method according to which the input signals of all the time delay elements are sampled at a fixed sampling period which is common to all the time delay elements.

While the DDA according to this invention will be described in detail later, it does not possess a special-purpose arithmetic unit for each arithmetical element. By preparing a single general-purpose arithmetic unit, data required for the corresponding element are loaded from the memories into the arithmetic unit in accordance with control instructions within a control memory, and the operations of several sorts of arithmetical elements including an integrator, a potentiometer, a time delay element etc. are performed in accordance with a time chart of FIG. 6. FIG. 6 illustrates an example in the case where four arithmetical elements of No. 1–No. 4 are comprised. ELC indicates the operation timing signal of the arithmetical elements, and ITE an iteration signal. Here, the arithmetical elements No. 1 and No. 4 are the time delay elements, and the sampling period h is set at $2 \cdot \Delta t$ by supposing m=2. In the figure, TA indicates the write and read timing signal for the memory A in FIG. 5(B), and this signal is generated by the AND logic between a flag DLYF appointing the time delay elements and a sampling signal SAMP. On the other hand, TB indicates the write and read timing signal for the memory B in FIG. 5(D).

The write operation into the memories A and B is performed by a method illustrated in FIG. 7. Numeral 71 in the figure designates an address counter (ADC) which indicates write addresses into the memories A and B, and which can appoint address V $(=2^w)$ at the maximum. Both the memories A and B have addresses O−V assigned thereto. In the write into the memories A and B, the content of the ADC 71 or the write addresses is/are made addresses 0 by a reset signal (RESET) in the intial state. During an operation, the content of the ADC 71 is incremented +1 in accordance with an increment signal UP, and the increment value $SDY_i$ in the sampling interval and the increment $\Delta Z'$ of the interpolated time delay output signal as previously stated are respectively written into the addresses of the memories A and B indicated by the ADC 71. As the increment signal UP, the timing signal TA is applied to the memory A, and the timing signal TB to the memory B. That is, the memory A has its write address renewed by the timing signal TA, and the memory B by the timing signal TB.

On the other hand, when the content of the ADC 71 has exceeded the value V, it becomes zero again. Accordingly, each memory A or B can be constructed into a memory 72 having a ring structure as shown in FIG. 7. With such construction, data can be written into the memories A and B unlimitedly in accordance with the increment signal UP. In this case, when address 0 is returned to beyond the maximum address V, data having been stored in address 0 till then is erased, and new data is written therein. The same applies to address 1 and the subsequent addresses. Now, letting p denote the sampling point and M denote the number of the time delay elements, data at the p (p=0, 1, . . . , n−1)-th sampling point concerning the j (j=1, 2, . . . , M)-th time delay element is written into address ($M \times p + j$) of the memory 72.

Subsequently, the control of the read operation from the memories A and B is performed by a method illustrated in FIG. 8. In case of the read operation, address memories 80 which manage the addresses of the memories A and B to read out data therefrom are disposed to the number of the elements. The managing memories are respectively denoted by $RA_0$, $RA_1$, . . . and $RA_{M-1}$, and they are generally termed an "ADM 81". The memories equal in number to the elements are needed because the respective time delays have different intervals to be read out.

An initial address INIT is set into the ADM 81 from a host computer (not shown) via a multiplexer (MPX) 82, for each time delay and before its operation. Such initial addresses are different between the memory A and the memory B, and are computed by the following steps in advance:

$$\text{First step} \begin{cases} IA_j = VA - (N_j - 1) \times M + 1 \\ IB_j = VB - Q_j \times M + 1 \end{cases} \quad (17)$$

$$\text{Second step} \begin{cases} \text{If } IA_j = VA, IA_j = 0 \\ \text{If } IB_j = VB, IB_j = 0 \end{cases}$$

Here, $IA_j$; the initial address of the memory A concerning the j-th time delay element, $IB_j$; the initial address of the memory B concerning the j-th time delay element, p1 VA; the maximum value of the addresses of the memory A, VB; the maximum value of the addresses of the memory B, M; the total number of the time delay elements, $N_j$; n in FIG. 4 concerning the j-th time delay element, $Q_j$; q in FIG. 4 concerning the j-th time delay element.

During the operation for generating the time delay, a counter (C1) 83 is incremented +1 by the increment signal UP after the counter 83 has been reset by the signal RESET in accordance with the iteration signal ITE in FIG. 6. Further, the contents of the addresses of the ADM 81 appointed by the counter 83 are read out and are added by an adder circuit 84 to the total number of the time delay elements in accordance with the increment signal UP. The added result is written again into the address of the ADM 81 appointed by the counter 83. Data are read out from the addresses of the memories A and B consequently appointed. The increment signal UP is the signal TA in FIG. 6 for the memory A, and the signal TB for the memory B.

The ADM 81 can handle the same range of addresses as that of the ADC 71 in FIG. 7, and can appoint address V at the maximum. Besides, each memory A or B is constructed as the foregoing memory 72. With the above method, therefore, data can be simply read out from the memories A and B unlimitedly by renewing the read addresses of the memories A and B for each time delay element and continuously in time. The maximum value VA of the addresses of the memory A and the maximum value VB of the addresses of the memory B must satisfy the following inequalities:

$$VA > (MAXN - 1) \times M \brace VB > (MAXQ - 1) \times M \quad (18)$$

Here, $MAXN = MAX(N_0, N_1, N_2, \ldots, N_j, \ldots)$
$MAXQ = MAX(Q_0, Q_1, Q_2, \ldots, Q_j, \ldots)$ As the memory A and the memory B, individual memory means may be disposed, or single memory means may well be divided into two memory areas to be used as a memory A area and a memory B area.

DETAILED DESCRIPTION OF THE PREFERRED EMBODIMENTS

Figure 9A:
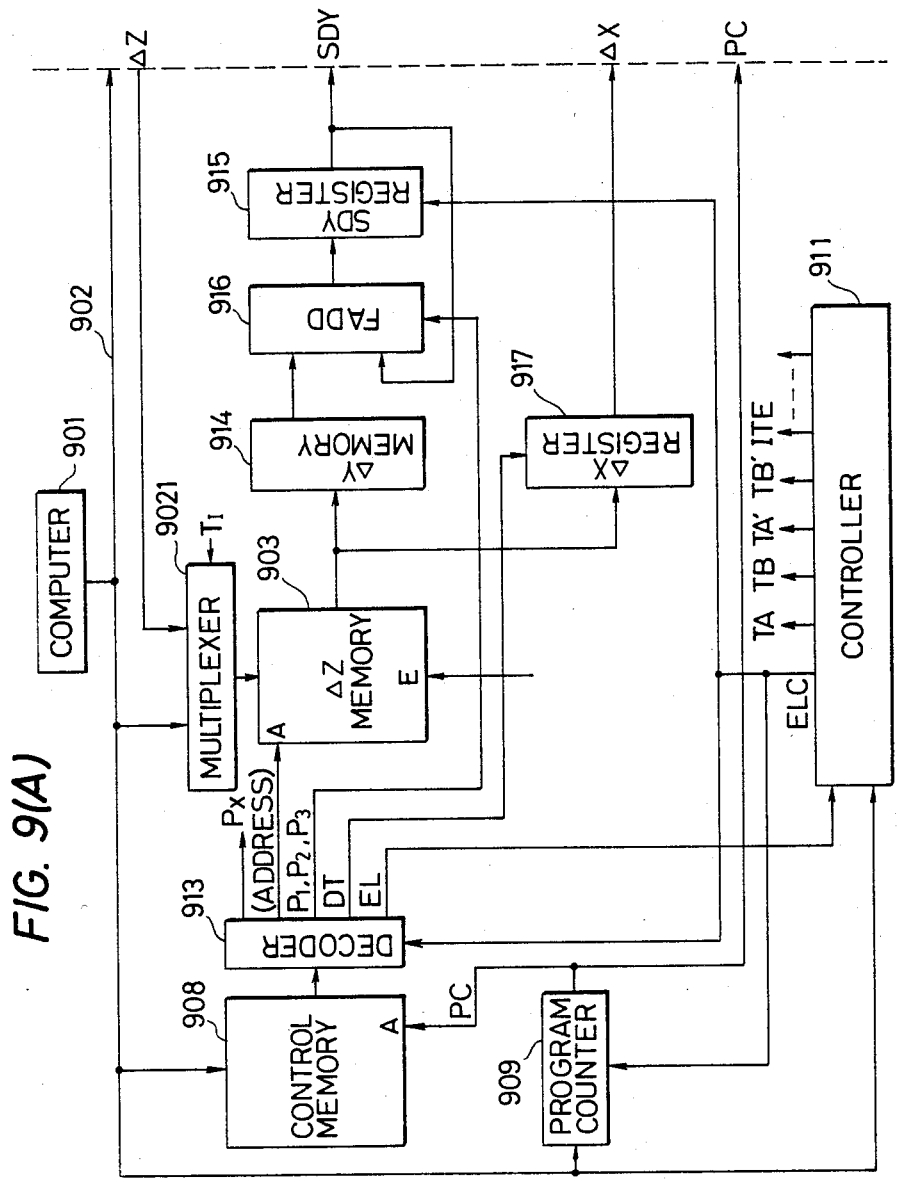
FIGS. 9(A) to 9(C) are diagrams showing the circuit arrangement of an embodiment of a DDA which executes operations for generating a time delay in accordance with this invention.
Figure 9B:
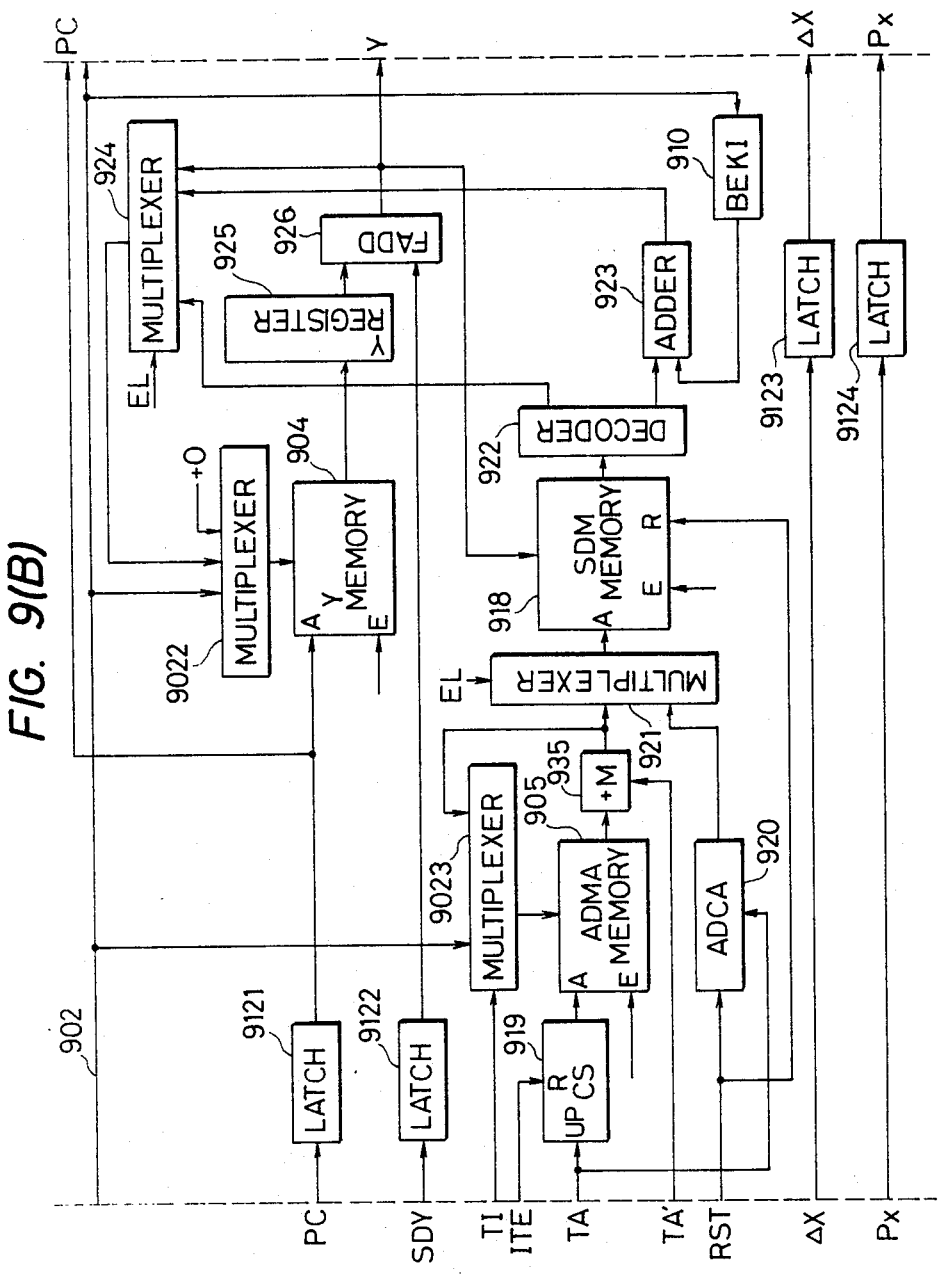
Figure 9C:
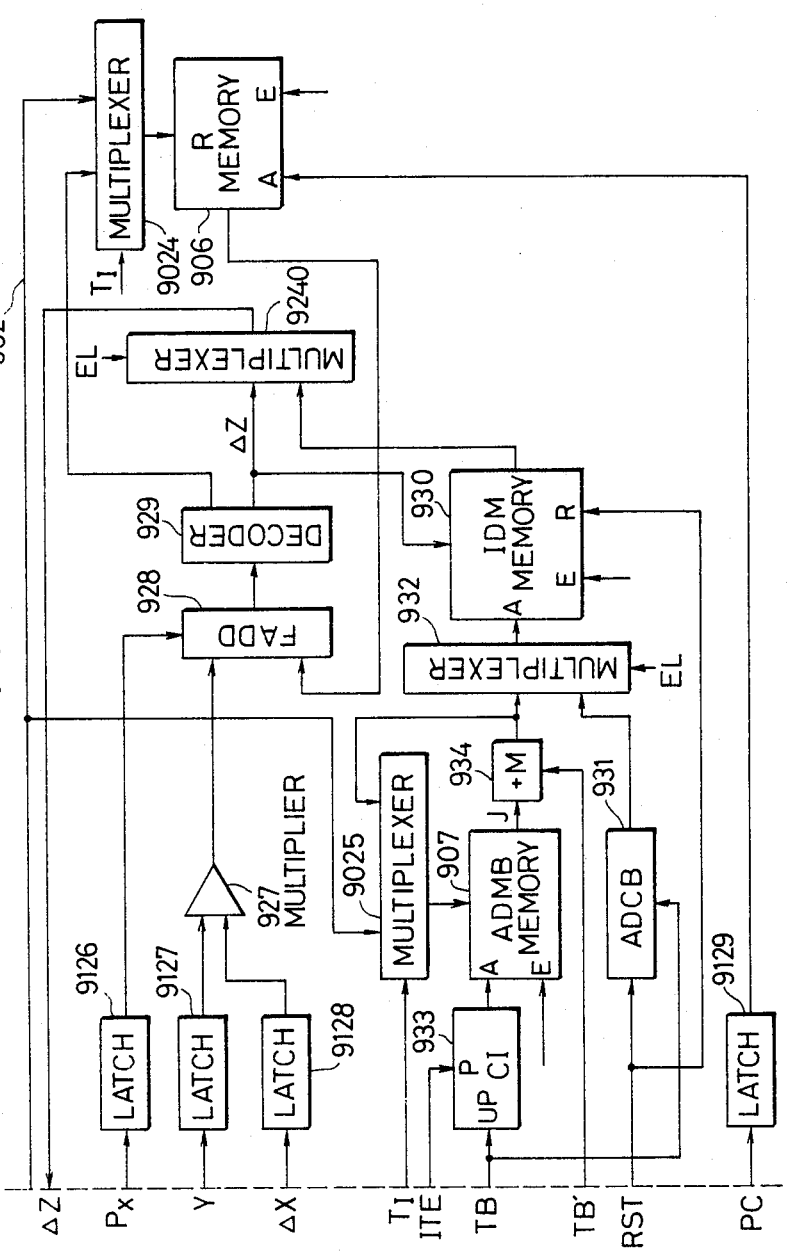
Figures 10, 11:
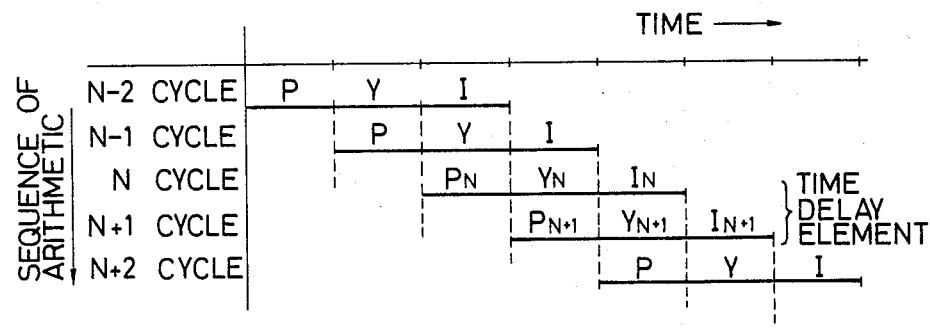
FIG. 10 is a time chart of a pipeline control in the DDA shown in FIGS. 9(A) to 9(C)
FIG. 11 is a diagram showing the bit construction of an operation control instruction in the DDA of FIGS. 9(A) to 9(C)

FIGS. 9(A)–9(C) show the block arrangement of a DDA which adopts this invention. In order to achieve a high operating speed, the operations of the DDA are carried out under a pipeline control as shown in FIG. 10 (refer to Japanese Patent Application Publication No. 54-15389).

An integrating operation in each iteration of the DDA is broadly classified into and is executed by the following three operation phases:

1 P phase; Pickup phase

The fine increments $\Delta Y_{i,j}$ of the j-th input variable in the i-th iteration are totaled for $j=1$ to $l$, to obtain an increment $\Delta Y_i$.

$$\Delta Y_i = \sum_{j=1}^{l} \Delta Y_{i,j} \quad (19)$$

2 Y phase; Update phase

The addition between the increment $\Delta Y_i$ and the content (denoted by $Y_{i-1}$) of the Y register of an integrator in a period preceding one iteration is performed, and the added result is made the content of the Y register at the i-th iteration. That is, the following operation is executed.

$$Y_i = Y_{i-1} + \Delta Y_i \quad (20)$$

3 I phase; Integration phase

The addition between the aforecited $Y_i$ and the content $(R_{i-1})$ of an R register is performed, 1 bit or several bits with an overflow component included is/are delivered as $\Delta Z_i$ from the added result (denoted by $R_i$), and the result with $\Delta Z_i$ removed from $R_i$ is set in the R register. That is, the following operation is executed.

$$R_i = R_{i-1} + Y_i \cdot \Delta X_i - \Delta Z_i \quad (21)$$

Here, $\Delta X_i$ denotes the fine increment of the integral independent variable in the i-th iteration.

FIGS. 9(A) to 9(C) correspond to the respective operation phases. FIG. 9(A) shows the block arrangement of the DDA for executing the P phase, FIG. 9(B) that for executing the Y phase, and FIG. 9(C) that for executing the I phase.

Latches 9121, 9122, 9123, 9124, 9126, 9127, 9128 and 9129 in these figures are buffers which are used for performing the operations of the pipeline control.

The time delay generating computation of this invention consists of the two parts of the interpolation operation of Equation (11) and the operation of Equation (16) for evaluating the variation of the input signal (variable) between samplings. The former corresponds to the I phase of the inegrating operation, while the latter corresponds to an operation with the P phase and the Y phase combined. However, the contents of the Y register are different between the former and the latter. Further, when the write and read times of the memories A and B, etc. are considered, the Y phase and the I phase become longer than ordinary integrating operations by the DDA. Therefore, the operating periods of time of the respective phases required for the operation for generating the time delay cannot be confined within 1 iteration of the DDA consisting of all the operation phases (P, Y and I phases). In the embodiment, therefore, the operation for generating the time delay is performed in operation cycles corresponding to two arithmetical elements. Referring to FIG. 10, the N-th and (N+1)-th cycles are used for one time delay element. The operations of Equation (11) are carried out in phases $Y_N$ and $I_N$, while the operations of Equation (16) are carried out in phases $Y_{N+1}$ and $I_{N-1}$.

In FIGS. 9(A) to 9(C), a computer 901 transmits respective initial values to a $\Delta Z$ memory 903 for storing the output increment $\Delta Z_i$ in the operation of Equation (21), a Y memory 904 for storing the operated result of Equation (20), an ADMA memory 905 for storing the initial address $IA_j$ in Equation (17), an R memory 906 for storing the operated result of Equation (21), and an ADMB memory 907 for storing the initial address $IB_j$ in Equation (17), via a common bus 902 and multiplexers 9021, 9022, 9023, 9024 and 9025. In addition, the computer 901 transmits a DDA operation control instruction to a control memory 908.

The computer 901 transmits a predetermined value to a program counter 909 for appointing the address of the control memory 908, and also transmits the exponent in Equation (15) to a BEKI register 910. Further, it functions to start and stop a controller 911 which generates a series of timing signals necessary for executing the operation of the DDA.

The operation of the DDA is performed in such a way that the operation control instruction read out from the address PC of the control memory 908 appointed by the program counter 909 is executed in accordance with the series of timing signals generated by the controller 911.

Here, the operation control instruction kept stored in the address appointed by the program counter 909 has a bit structure which is adapted to appoint the kind of an arithmetic unit to be used for an operation in a predetermined iteration (for example, i-th iteration), an operation mode associated therewith, etc.

FIG. 11 shows an example of the bit structure of the operation control instruction.

Among various parts in FIG. 11, EL indicates the kind of the arithmetic unit which is to be used for executing a desired operation, and $\Delta X_A$ indicates that address of the $\Delta Z$ memory 903 in which the fine increment $\Delta X_i$ of the integral independent variable in Equation (21) is stored. DT indicates a flag of 1 bit for indicating whether or not the aforecited $\Delta X_i$ is the time increment $\Delta t$, and $P_x$ indicates the polarity of the aforecited $\Delta X_i$. $\Delta Y_{A1}$, $\Delta Y_{A2}$ and $\Delta Y_{A3}$ (in this example, the number of inputs is assumed to be three) represent those addresses of the $\Delta Z$ memory 903 in which $\Delta Y_{i,1}$, $\Delta Y_{i,2}$ and $\Delta Y_{i,3}$ in Equations (16) and (19) are stored, respectively. $P_1$, $P_2$ and $P_3$ represent 1-bit flags for controlling the polarities of the aforecited $\Delta Y_{i,1}$, $\Delta Y_{i,2}$ and $\Delta Y_{i,3}$, respectively.

The functions of the circuit arrangement in FIGS. 9(A)–9(C) will now be described more in detail by taking as an example a case where the operation of this invention for generating the time delay is executed on the basis of the operation control instruction having the bit structure of FIG. 11.

In the example of FIG. 11, the N-th arithmetic unit is assumed an arithmetic unit $DLY_I$ which executes the interpolation operation of Equation (11) in the operation phases $Y_N$ and $I_N$ shown in FIG. 10, while the (N+1)-th arithmetic unit is assumed an arithmetic unit $DLY_{II}$ which executes the operation of obtaining the variation of the input signal in the sampling interval as given in Equation (16), in the operation phases $P_{N+1}$ and $Y_{N+1}$ in FIG. 10.

When the address appointed by the program counter 909 is N, the operation control instruction of the arithmetic unit $DLY_I$ is read out from the control memory 908. The operation control instruction read out is decoded by a decoder 913, and the decoded signals of the respective parts of the instruction are fed to the corresponding circuit portions.

The decoded result of the part EL indicative of the kind of the arithmetic unit to be used is fed to the controller 911. Upon receiving this result, the controller 911 creates the timing signals for executing the appointed operation for generating the time delay as based on the pipeline control and transmits it to the predetermined circuit portions. In case of the arithmetic unit $DLY_I$, in order to perform the interpolation operation of Equation (11), the controller 911 transmits an enable signal (ENABLE) to the terminals E of the $\Delta Z$ memory 903, the Y memory 904 and the ADMA memory 905 and also transmits the series of timing signals necessary for the operation of Equation (11). In FIGS. 9(A)–9(C), lines which connect the controller 911 and such terminals are omitted for the sake of brevity.

In the $P_N$ phase of the arithmetic unit $DLY_I$, the decoded results $(\Delta Y_{A1})$, $(\Delta Y_{A2})$ and $(\Delta Y_{A3})$ of the respective addresses $\Delta Y_{A1}$, $\Delta Y_{A2}$ and $\Delta Y_{A3}$ are applied to the address terminal A of the $\Delta Z$ memory 903 as in case of other arithmetic unit, and the values $\Delta Y_{i,j}$ (j=1, 2 and 3) are successively read out from the appointed addresses and set into a $\Delta Y$ register 914.

Figure 6:
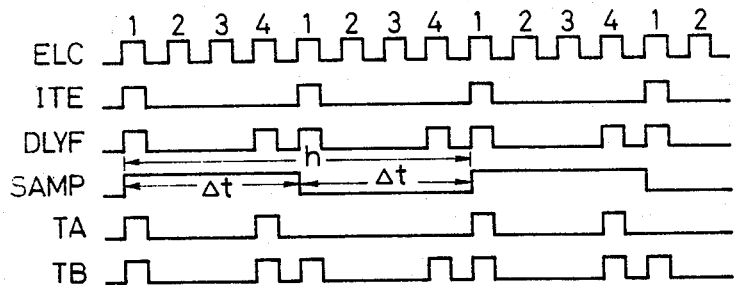
FIG. 6 is a time chart of basic control signals in the execution of an operation by a DDA which adopts this invention.

The value $\Delta Y_{i,1}$ set in the $\Delta Y$ register 914, and the content $(SDY_{i,0}=0)$ of a SDY register 915 reset by the operation timing signal ELC in FIG. 6 prior to the i-th iteration are applied to a floating-point added FADD 916, which performs the following floating-point operation:

$$SDY_{i,0} + \Delta Y_{i,1} = \Delta Y_{i,1} \qquad (22)$$

The result $\Delta Y_{i,1}$ is set into the SDY register 915 as $SDY_{i,1}$.

Figure 12:
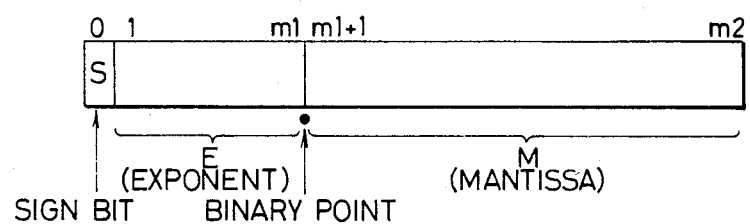
FIG. 12 is a diagram showing the structures of floating-point numerical value systems which are used in the operations of the DDA of FIGS. 9(A) to 9(C)
Figure 12:
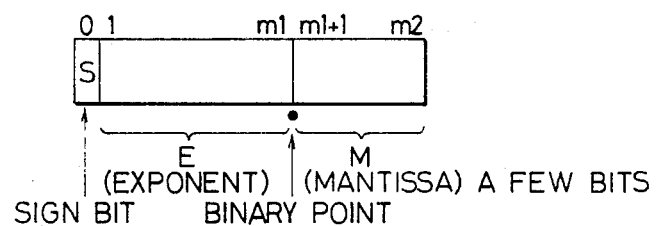

Here, the numerical value systems of data handled in the DDA of this invention will be briefly described. FIG. 12 shows the numerical value systems of the data handled in this invention. Variables to be used for operations are floating-point numbers which assume the numerical value system of either a data format A or B. Variables belonging to the data format A are the integrand Y, the integral residue R, the summation SDY of the input variable, etc. which do not employ any incremental format. On the other hand, variables belonging to the data format B are the fine increment $\Delta Y$ of the input variable, the fine increment $\Delta X$ of the integral independent variable, the fine increment $\Delta Z$ of the output variable, etc. which have the incremental format.

After the operation of Equation (22), the value $\Delta Y_{i,2}$ set in the $\Delta Y$ register 914 and the content $(SDY_{i,1} = \Delta Y_{i,1})$ of the SDY register 915 are applied to the FADD 916, which performs the following operation:

$$SDY_{i,1} \Delta Y_{i,2} = \Delta Y_{i,1} + \Delta Y_{i,2} \qquad (23)$$

The result is set into the SDY register 915 as $SDY_{i,2}$.

By repeating similar operations, $\Delta Y_i$ of Equation (19) are obtained in the SDY register 915 as $SDY_{i,l} = SDY_{i,3}$.

In the above operations, the SDY register 915 and the FADD 916 correspond to accumulators.

In case where the decoded result $(P_1)$, $(P_2)$ or $(P_3)$ of the polarity bit is the negative polarity, the addition between $SDY_{i,j}$ and the 2's complement concerning the negative-polarity fine increment is executed in the FADD 916. For example, in case where $\Delta Y_{i,2}$ has become negative in polarity, the following operation is performed:

$$SDY_{i,1} - \Delta Y_{i,2} = \Delta Y_{i,1} - \Delta Y_{i,2} \qquad (24)$$

Next, in case where the flag (DT) has indicated that $\Delta X_i$ read out from the address of the $\Delta Z$ memory 903 appointed by the decoded result $(\Delta X_A)$ of the address $\Delta X_A$ corresponds to the time increment $\Delta t$, the aforecited $\Delta X_i$ is set into a $\Delta X$ register 917.

In case of the arithmetic unit $DLY_I$, the addresses $\Delta Y_{A1} - \Delta Y_{A3}$ appoint such specific addresses that numerical values within the $\Delta Z$ memory 903 are zero, and the content of the SDY register 915 obtained in the $P_N$ phase becomes zero. Although the operations of the $P_N$ phase are performed in the same procedure as in the other arithmetic units, the values of SDY obtained are not used.

In the next $Y_N$ phase, the values SDY, $P_c$, $\Delta X$ and $P_x$ obtained in the $P_N$ phase are first latched into latches for buffers 9121–9124, respectively. Thereafter, the gradient $Y_i$ which is stored in the Y memory 904 and which is used in the operation of Equation (11) is read out and is sent to the circuit of the next $I_N$ phase.

The read of the gradient is carried out in such a way that the content of the buffer latch 9121 having latched the output of the program counter 909 is applied to the Y memory 904, whereupon the Y memory is enabled by the enable signal from the controller 911. The gradient $Y_i$ is read out from the same address of the Y memory 904 as No. of the arithmetic unit, and is set into a Y register 925. Via an FADD 926 provided with an accumulator, it is fed to the circuit of FIG. 9(C) for executing the $I_N$ phase.

Figure 1:
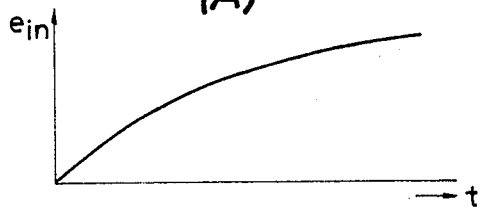
FIGS. 1(A) to 1(D) are diagrams showing a conventional method of generating a time delay as employs a digital memory.
Figure 1:
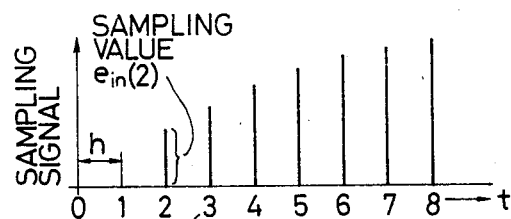
Figure 1:
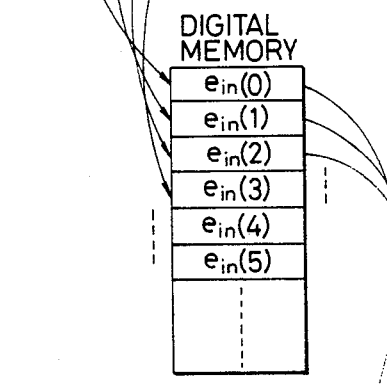
Figure 1:
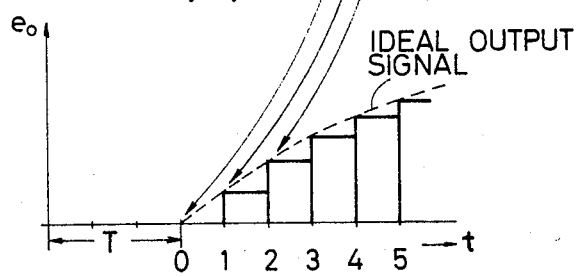
Figure 2:
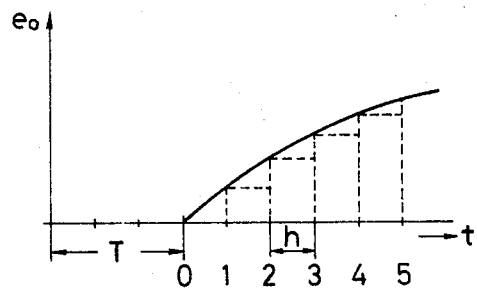
FIG. 2 is a diagram showing an output signal of a time delay based on an interpolation mode.
Figure 3:
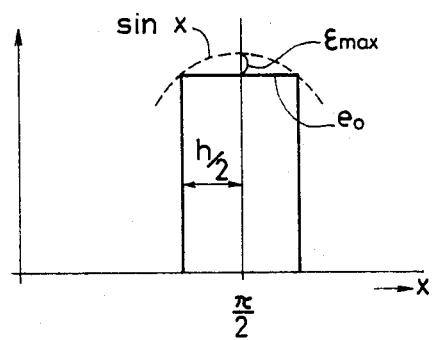
FIG. 3 is a diagram showing the state in which the maximum error develops in the interpolation mode.
Figure 4:
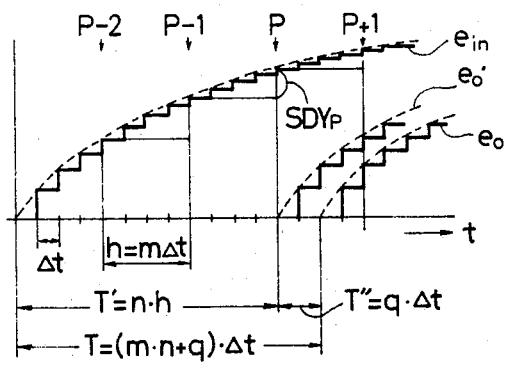
FIG. 4 and FIGS. 5(A) to 5(E) are diagrams for explaining the principles of this invention.
Figure 5:
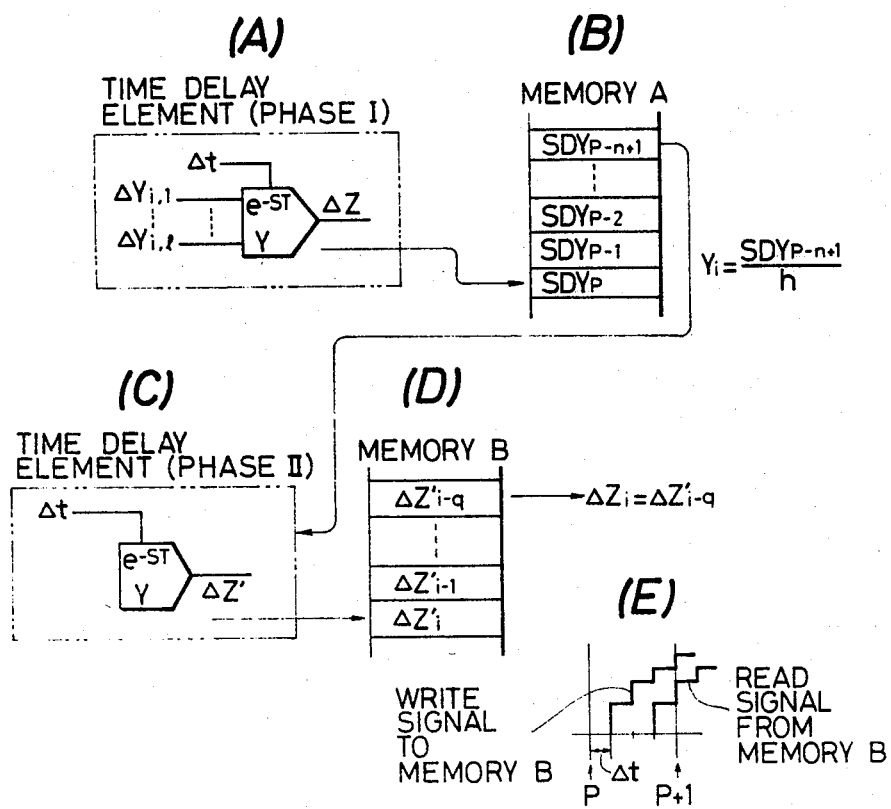

In the $I_N$ phase of the arithmetic unit $DLY_I$, the values $P_x$, Y, $\Delta X$ and $P_c$ sent from the circuit of FIG. 9(B) are respectively latched into latches for buffers 9126–9129. Thereafter, the operation of Step 1 of Equation (11) or the interpolation operation for each time increment $\Delta t$ and the conversion of the output signal into the incremental format are carried out. In addition, the time delay which corresponds to $q \cdot \Delta t$ shown in FIG. 4 is generated by writing the data into and reading the data from the memory B. Finally, the output signal having the time delay $T = m \cdot n \cdot \Delta t + q \cdot \Delta t$ is provided.

The interpolation operation of Equation (11) is started by multiplying the content $Y_i$ of the buffer latch 9127 and the content $\Delta X_i$ of the buffer latch 9128 by means of a multiplier 927. The output $Y_i \cdot \Delta X_i$ of the multiplier 927 is added by an FADD 928 to the integral residue $R_{i-1}$ preceding one iteration as read out from the R memory 906. The result passes from the FADD 928 and is applied to a decoder 929. This decoder 929 forms the increment $\Delta Z_i'$ in which the mantissa of $(m1+1)-m2$ is composed of 1 bit to several bits as in the data format B of FIG. 12. The increment $\Delta Z_i'$ is sent to an IDM memory 930. The residue $R_i$ with the increment $\Delta Z_i'$ removed from the integral value as obtained by the FADD 928 is stored via the multiplexer 9024 into the same address of the R memory 906 as No. (N) of the arithmetic unit $DLY_I$ appointed by the buffer latch 9129.

On the other hand, the increment $\Delta Z_i'$ sent to the IDM memory 930 is stored into the IDM memory 930 corresponding to the memory 72 in FIG. 7, by the method explained with reference to FIG. 7. That is, the IDM memory 930 and an ADCB counter 931 correspond to the memory B and the ADC counter 71, respectively. The content of the ADCB counter 931 is applied to the terminal A of the IDM memory 930 via a multiplexer 932, and it is stored into the address of an SDM memory 918 appointed by the output of the multiplexer 932, by the enable signal (E) from the controller 911.

The read of the output increment $\Delta Z_i$ having the time delay T, from the IDM memory 930 is executed as soon as the above write has ended.

Figure 8:
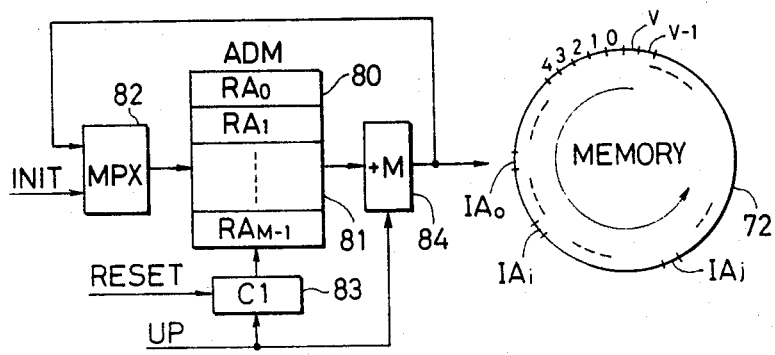
FIG. 8 is a diagram showing a method of controlling read from the digital memory in this invention.

The ADMB memory 907 and a counter (CI) 933 in the circuit of FIG. 9(C) correspond to the address memory ADM 81 and the counter (C1) 83 in FIG. 8, respectively. The counter (CI) 933 is reset every pulse of the iteration signal ITE (in FIG. 6) which is generated by the controller 911. The read of the increment $\Delta Z_i$ is started in such a way that the content of the counter (CI) 933 is applied to the A (address) terminal of the ADMB memory 907, and that the address J of the IDM memory 930 in which the desired $\Delta Z_i$ is stored is read out from the ADMB memory 907 by the enable signal (E) from the controller 911. Since a timing signal TB' remains "off", the address J read out has not the aforecited M added thereto in an adder circuit 934. It is applied to the A (address) terminal of the IDM memory 930 via the multiplexer 932. Thereafter, the desired output increment $\Delta Z_i$ is read out from the IDM memory 930 by the enable signal (E) from the controller 911.

The output increment $\Delta Z_i$ having the time delay T as thus read out is writted into the address (N) of the $\Delta Z$ memory 903 corresponding to the arithmetic unit $DLY_I$, via a multiplexer 9240 and the multiplexer 9021 in FIG. 9(A).

After the desired time delay output has been obtained, the content of the address (the content of the counter 933) of the ADMB memory 907 corresponding to the arithmetic unit $DLY_I$ has the aforecited M added thereto by the adder 934 and is again stored into the address of the ADMB memory 907 corresponding to the arithmetic unit $DLY_I$ via the multiplexer 9025, in order to use the resulting content for the operation of the arithmetic unit $DLY_I$ in the next iteration. The contents of the counter (CI) 933 and the ADCB 931 have one added thereto at the fall of the timing signal TB in FIG. 6. The "add one" operation by the adder circuit 934 is effected with the timing signal TB' which is generated by the controller 911 and which falls somewhat earlier than the timing signal TB.

Thus, the series of operations of the arithmetic unit $DLY_I$ are completed. There will now be described in detail the functions of the arithmetic unit $DLY_{II}$ which executes operations for finding the variation $(SDY_P)$ of the input signal of the time delay element in the sampling interval as given by Equation (16), in the time delay element of this invention.

First, in the operation phase $P_{N+1}$ shown in FIG. 10, the summation of the input signal of the arithmetic unit $DLY_{II}$ during the i-th iteration is obtained. This operation is executed by the circuit of FIG. 9(A), and is carried out in the same procedure as in the $P_N$ phase of the arithmetic unit $DLY_I$.

In the next $Y_{N+1}$ phase, as in the $Y_N$ phase of the arithmetic unit $DLY_I$, the values SDY, PC, $\Delta X$ and $P_x$ obtained in the $P_{N+1}$ phase are respectively latched in the buffer latches 9121–9124. Thereafter, predetermined operations to be stated below are performed.

In the $Y_{N+1}$ phase, the variations of the input signal in the sampling interval are accumulated at the respective iterations. To this end, $Y_{i-1}$ preceding one iteration is read out from the Y memory 904 corresponding to the arithmetic unit $DLY_{II}$ and is set into the Y register 925 via a multiplexer 924. The content $Y_{i-1}$ of the Y register 925 and the content $SDY_i$ of the buffer latch 9122 are applied to the FADD 926, in which the following operation is performed:

$$Y_i = Y_{i-1} + SDY_i \quad (25)$$

$Y_i$ consequently obtained is transmitted to the multiplexer 924 and the SDM memory 918.

Next, whether or not the present i-th iteration is an iteration corresponding to a sampling point (refer to FIG. 4) is examined. When it is not the iteration corresponding to the sampling point, the value $Y_i$ obtained by the FADD 926 is stored via the multiplexers 924 and 9022 into the address of the Y memory corresponding to the arithmetic unit $DLY_{II}$. On the other hand, when the present iteration corresponds to the sampling point, the above $Y_i$ is written into the SDM memory 918 by the method illustrated in FIG. 7. Simultaneously therewith, the variation SDY of the input signal of the arithmetic unit $DLY_{II}$ in the sampling interval as has been stored in the $(p-n+1)$-th iteration is read out from the SDM memory 918 by the method illustrated in FIG. 8, it is used to operate the exponent of Equation (15) so as to obtain the gradient $Y_i$ for use in Equation (11), and the gradient $Y_i$ is stored into the address of the Y memory 904 corresponding to the arithmetic unit $DLY_I$.

Which of the processings is performed is decided by the controller 911. The timing signal TA in FIG. 6 consequently issued by the controller 911 is transmitted to a counter (CS) 919 and an address counter (ADCA) 920 in FIG. 9(B), whereby the above processings are changed-over.

Hereunder, the latter processing will be described in detail.

Figure 7:
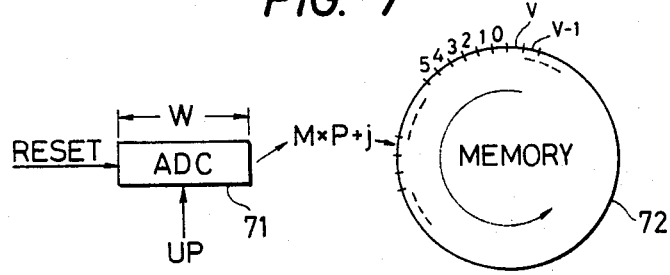
FIG. 7 is a diagram showing a method of controlling write into a digital memory in this invention.

The SDM memory 918 in FIG. 9(B) corresponds to the memory A, and the counter (CS) 919, the address memory (ADMA) 905 and the address counter (ADCA) 920 correspond respectively to the counter (C1) 83 and address memory (ADM) 81 in FIG. 8 and the counter (ADC) 71 in FIG. 7.

The write of the gradient $Y_i$ into the SDM memory 918 is executed in such a way that the content of the counter (ADCA) 920 is sent to the A terminal of the SDM memory 918 via a multiplexer 921, and that it is written into the address appointed by the content of the counter (ADCA) 920, by the enable signal which the controller 911 issues in time with the timing signal TA.

Next, in case of reading out the above data from the SDM memory 918, that address of the ADMA memory 905 whose content is the content of the counter (CS) 919 or is the address of the SDM memory 918 storing the data to-be-read-out is applied to the A terminal of the ADMA memory 905. The enable signal issued by the controller 911 is applied to the E terminal of the ADMA memory 905. Then, the aforecited address is read out from the ADMA memory 905 and is applied to the A terminal of the SDM memory 918 via the multiplexer 921 without being subjected to the "add one" operation.

The desired data or the variation of the input signal of the arithmetic unit $DLY_{II}$ in the sampling interval is read out by the enable signal from the controller 911. The data read out is separated by a decoder 922 into the exponent (1 to m1) and the mantissa (m1+1 to m2) as in the data format A shown in FIG. 12. The separated exponent is added by an adder 923 with the content of the register (BEKI) 910 which has been set from the computer 901 via the common bus 902 before the operation. The sum is transmitted to the Y memory 904 via the multiplexers 924 and 9022 together with the mantissa.

The gradient $Y_i$ thus evaluated is written into the address of the Y memory 904 corresponding to the arithmetic unit $DLY_I$. In addition, the numerical value zero is written via the multiplexer 9022 into the address of the Y memory 904 corresponding to the arithmetic unit $DLY_{II}$.

The gradient $Y_i$ for use in Equation (11) has been obtained by the above procedure, whereupon for the next sampling, the content of the address (the content of the counter (CS) 919) of the ADMA memory 905 corresponding to the arithmetic unit $DLY_{II}$ has the foregoing value M added by an adder circuit 935, and the sum is again stored into the address of the ADMA memory 905 corresponding to the arithmetic unit $DLY_{II}$ via the multiplexer 9023. The contents of the counter (CS) 919 and the ADCA 920 have one added at the fall of the timing signal TA in FIG. 6. The "add" operation by the adder circuit 935 is effected by the timing signal TA' which is issued by the controller 911 and which fall somewhat earlier than the timing signal TA.

The counter (CS) 919 is reset every iteration signal (ITE in FIG. 6) issued by the controller 911.

In the above, the embodiment in which the time delay generating method of this invention is applied to the DDA has been described in detail. Now, an embodiment in the case of applying the invention to an apparatus other than the DDA will be briefly described.

Figure 13:
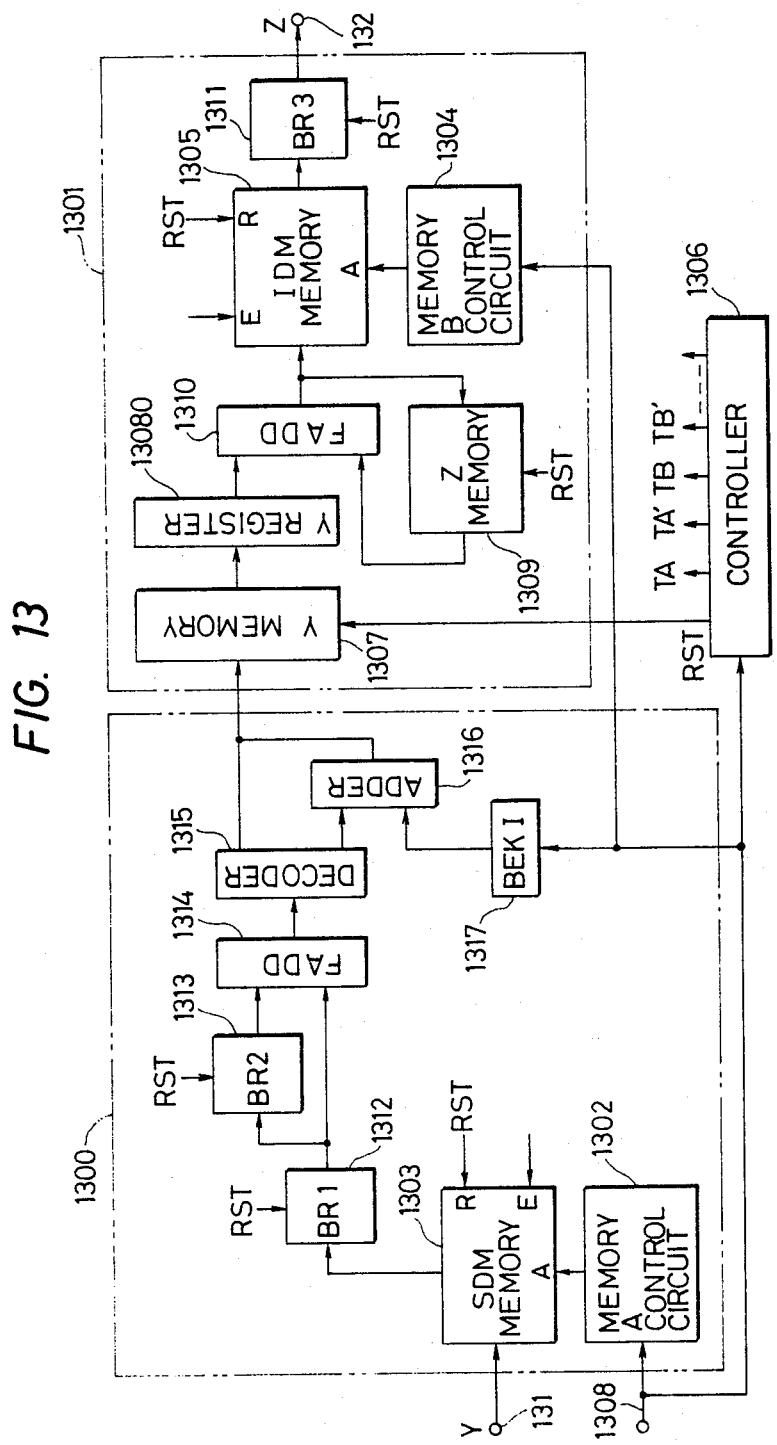
FIG. 13 is a diagram showing the circuit arrangement of an embodiment in the case where this invention is applied to operations other than those of the DDA.

FIG. 13 shows a circuit block diagram of the embodiment for the apparatus other than the DDA. A portion 1300 enclosed with a broken line is the circuit in the DDA corresponding to FIG. 9(A). It functions to evaluate the variation of the input signal in the sampling interval and to compute the gradient for use in the interpolation operation with the variation. Likewise, a portion 1301 enclosed with a broken line is the circuit in the DDA corresponding to FIG. 9(C). It functions to perform the interpolation operation by the use of the gradient evaluated by the portion 1300 every iteration, and to provide an output signal having a desired time delay.

The time delay generating circuit shown in FIG. 13 generate only the time delay alone. As its input signal, Y is applied from a terminal 131, and as its result, an output signal Z is delivered from a terminal 132. Unlike those of the DDA, the input and output signals are not handled in the incremental format, but they are represented by the data format A in FIG. 12.

Further, a memory A control circuit 1302 is the same circuit as the portion in FIG. 9(B) consisting of the multiplexer 9023, ADMA memory 905, counter (CS) 919, counter (ADCA) 920, adder circuit 935 and multiplexer 921. This circuit 1302 controls the addresses of an SDM memory 1303 to write the input signal $e_{in}(Y)$ into or read it from the memory 1303. A memory B control circuit 1304 is the same circuit as the portion in FIG. 9(C) consisting of the multiplexer 9025, ADMB memory 907, counter (CI) 933, counter (ADCB) 931, adder circuit 934 and multiplexer 932. This circuit 1304 controls the addresses of an IDM memory 1305 to be written in or read out.

A common bus 1308 is a transmission line which transmits information from a computer (not shown). It sends the initial address $IA_j$ in Equation (17) to be stored in the ADMA memory within the memory A control circuit, the initial address $IB_j$ in Equation (17) to be stored in the ADMB memory within the memory B control circuit, and an index ($=-b$) for use in a gradient computation of Equation (26), referred to below, to the respective circuits. It also sends a control signal for starting or stopping a controller 1306 which generates a series of timing signals necessary for the operation of the time delay.

As compared with the embodiment for the DDA, the arithmetic circuit shown in FIG. 13 differs only in the portion for evaluating the gradient for use in the interpolation operation from the input signal and in the method of operating the interpolation. Since the write and read controls for the SDM memory 1303 and the IDM memory 1305 are made on the basis of the timing signals in FIG. 6 and by procedures similar to those in the case of the DDA, they will be briefly explained.

The operation for generating the time delay in the embodiment of FIG. 13 is started in such a way that a start signal transmitted from the computer via the common bus 1308 is sent to the controller 1306. When starting the operation, the controller 1306 supplies a reset signal RST to predetermined circuit parts in FIG. 13, to reset the contents thereof. Thereafter, it generates the series of timing signals required for the operation for generating the time delay.

The embodiment shown in FIG. 13 first performs operation contents corresponding to the arithmetic unit $DLY_I$ of the DDA by means of the circuit of the portion 1301, and thereafter executed operation contents corresponding to the arithmetic unit $DLY_{II}$ of the DDA by means of the circuit of the portion 1300. Then, the operations of one iteration are completed.

In the interpolation operation, a gradient $G_p$ computed by the portion 1300 in the immediately preceding sampling interval and given below is read out from the same address of a Y memory 1307 as No. of a time delay element noted, and it is set into a Y register 13080.

$$G_p = \Delta Y_{p-q+1}(M) \cdot 2^{[\Delta Y_{p-q+1}(E)-b]} \quad (26)$$

Here, the suffixes p and q in Equation (26) are identical to those in FIG. 4, and the variable b is identical to that in Equation (12).

Subsequently, the result $Z'_{i-1}$ of the interpolation operation preceding one iteration is read out from the same address of a Z memory 1309 as No. of the time delay element noted, and it is added with the gradient $G_p$ being the content of the Y register 13080 by means of an adder FADD 1310 which is of the floating-point operation type. The result of the addition is denoted by $Z'_i$.

$$Z'_i = Z'_{i-1} + G_p \quad (27)$$

The result $Z'_i$ is stored into the same address of the Z memory 1309 as that of the aforecited value $Z'_{i-1}$. Simultaneously therewith, a procedure similar to the procedure described as to the arithmetic circuit of the DDA is carried out by the memory B control circuit 1304, thereby to store the result $Z'_i$ into the IDM memory 1305. Using as an address the content of a counter within the memory B control circuit 1304 as corresponds to the counter ADCB in FIG. 9(C), the output signal $Z_i$ having the desired time delay is read out from the IDM memory 1305. It is set into a buffer register (BR3) 1311 and then delivered to another arithmetic element from the output terminal 132.

The interpolation operation thus far described is carried out by employing as its basic signal the timing signal TB shown in FIG. 6.

Next, there will be explained the procedure for obtaining the gradient $G_p$ by performing the operation indicated in Equation (26) by means of the portion 1300.

The gradient $G_p$ is evaluated every sampling period h expressed by Equation (12). The input signal Y is written into the SDM memory 1303 on the basis of the timing signal TA in FIG. 6. The write control is executed by the memory A control circuit 1302, and the procedure thereof will not be explained here because it is the same as in the case of the DDA. After the sampling value $Y_p$ of the input signal has been stored into the SDM memory 1303, the (p−q+1)-th sampling value $Y_{p-q+1}$ of the time delay element noted is read out from the address of the SDM memory 1303 indicated by the memory A control circuit 1302 and is set into a buffer register (BR1) 1312. The content of the buffer register (BR1) 1312 and that of a buffer register (BR2) 1313 are added by an adder (FADD) 1314 of the floating-point operation type, and the variation of the input signal is evaluated by the following operation:

$$\Delta Y_{p-q+1} := Y_{p-q+1} - Y_{p-q} \quad (28)$$

The variation $\Delta Y_{p-q+1}$ is separated into a mantissa and an exponent by a decoder 1315. The exponent is added by an adder 1316 with a content ($= -b$) having been set in a register (BEKI) 1317 by the computer in advance, and the sum is again written into the address of the Y memory corresponding to the time delay element noted, along with the aforecited mantissa. Simultaneously therewith, the content of the register BR1 is set into the register BR2 so as to be used for the computation of the gradient in the next sampling interval.

The embodiment in the case where the time delay generating method of this invention is applied to any arithmetic circuit other than the DDA, is constructed and operated as thus far described.

The embodiments shown in FIGS. 9(A)–9(C) and FIG. 13 are the arithmetic circuits which handle data expressed by floating-point numbers. Fixed-point operations can be performed by the same block arrangement except the decoder and the adder which are used for the computation of the gradient. In this case, the decoder and the adder are replaced with a shifter, the mantissa of the gradient is shifted by the shifter to the amount of the exponent of the gradient, and only the resulting mantissa is used as the value of the gradient.

As set forth above, according to this invention, the capacity of a memory for use in the generation of a time delay is allowed to be about 1/90 as compared with that in a method which merely samples an input signal and read out and reconstructs it after lapse of the time delay. In addition, owing to the development of a simple memory control system, a long time delay can be generated at high speed and at high accuracy merely by increasing the memory capacity. In such manner, the invention is greatly effective.

We claim:

1. A method of generating a signal with a time delay in response to and in correspondence with an input signal, comprising the first step of sampling said input signal at a predetermined sampling frequency providing a sampling interval equal to an integral number of times (the integer being at least 2) the cycle time of an operation cycle, evaluating at each sampling point the variation of said input signal during a sampling interval between each particular sampling point and the previously adjacent sampling point, and storing such variations successively into a first memory; the second step of successively reading out from said first memory for each current sampling interval the variation in a sampling interval which precedes the current sampling interval by a predetermined number of sampling intervals according to the desired time delay; and the third step of generating a value of said input signal for each operation cycle for each of said preceding sampling intervals by an interpolation operation based on the variation read out from said first memory, said cycle time and said sampling interval, and providing the generated values as an output signal having the desired time delay for said input signal of each operation cycle.

2. A method of generating a signal with a time delay as defined in claim 1, wherein said third step includes the step of storing the generated values of the respective operation cycles for each of the sampling intervals into a second memory, and successively reading out the values stored in said second memory memory corresponding to an operation cycle preceding the current operation cycle by a predetermined number of operation cycles providing said read-out values as said output signal.

3. A method of generating a time delay as defined in claim 1 or claim 2, wherein said predetermined number of sampling intervals is equal to the whole number portion of the quotient obtained by dividing said time delay by said sampling interval.

4. A method of generating a signal with a time delay as defined in claim 2, wherein said predetermined number of operation cycles is equal to the quotient obtained when the remainder obtained when said time delay divided by said sampling interval is further divided by the operation cycle time.

5. A method of generating a signal with a time delay as defined in claim 1 or claim 4, wherein said third step includes performing the interpolation operation based on said sampling interval and said cycle time by the use of a value obtained by dividing said read-out variation by said sampling interval and multiplying the result by an integral multiple of the cycle time, and further including expressing said input signal in a floating-point format composed of an exponent and a mantissa, thereby to express said variation (denoted by D) in a format of:

$D = \Delta M \times 2^{\Delta E}$ (where $\Delta M$ denotes a mantissa, and $\Delta E$ and exponent), and expressing the sampling period $h_i$ corresponding to the i-th (i being a positive integer) time delay element in a format of:

$h_i = 2^\alpha$ (where $\alpha$ denotes an integer), thereby to evaluate the exponent of the divided value by an operation of:

$\Delta E - \alpha$.

6. A method of generating a signal with a time delay as defined in claim 1, wherein said first step includes the step of expressing said input signal in an incremental format in which it is rounded into $n_i$ ($n_i$ being a positive integer) bits, and the step of storing a result obtained by accumulating the increments of said input signal in the operation cycles over said sampling interval into said first memory as said variation, and wherein said third step includes the step of using as an integration value of each operation cycle a value which is obtained by multiplying said operation cycle time and a value obtained in such a way that the variation read out from said first memory in response to a predetermined address is divided by said sampling interval, the step of rounding into $n_2$ ($n_2$ being a positive integer) bits a value obtained by adding said integration value and a remainder of the integration value in the operation cycle immediately preceding the particular current operation cycle, and storing the sum of $n_2$ bits into said second memory as said generated value, and the step of using the generating value read out from said second memory at a predetermined address as the output signal at said desired time delay expressed in an incremental format.

7. A method of generating a time delay as defined in claim 1, wherein said first step includes the step of successively storing the variations of said input signal in the sampling interval between each sampling point of said input signal and the adjacent sampling point into said first memory based on the addresses appointed by first counter means while changing the count value of said first counter means incrementally for each sampling point of said input signal, and wherein said second step includes the step of dividing first address memory means for appointing the addresses of said first memory to read out desired data therefrom into a first set of partial memory areas equal in number to the number of said sampling intervals of said time delay, and the step of successively reading out the variations in the sampling interval preceding the current sampling interval from said first memory means based on addresses appointed by said first address memory means while changing the contents of said first set of partial memory areas for each sampling interval.

8. A method of generating a time delay as defined in claim 1 or claim 7, wherein said third step includes the step of successively storing said generated values of the respective operation cycles into said second memory based on addresses appointed by a second counter means while changing a count value of said second counter means incrementally for each desired time delay at each operation cycle, the step of dividing second address memory means for appointing the addresses of said second memory means to read out desired values therefrom, into a second set of partial memory areas equal in number to said time delay, and the step of reading out the generated values in the operation cycle preceding a predetermined cycle number to the particular operation cycle, as said values corresponding to said generated values from said second memory means based on addresses appointed by said second address memory means while changing the contents of said second set of partial memory areas for each operation cycle.

* * * * *